(No Model.)
J. THOMSON.
WATER METER.
No. 602,378.                    Patented Apr. 12, 1898.
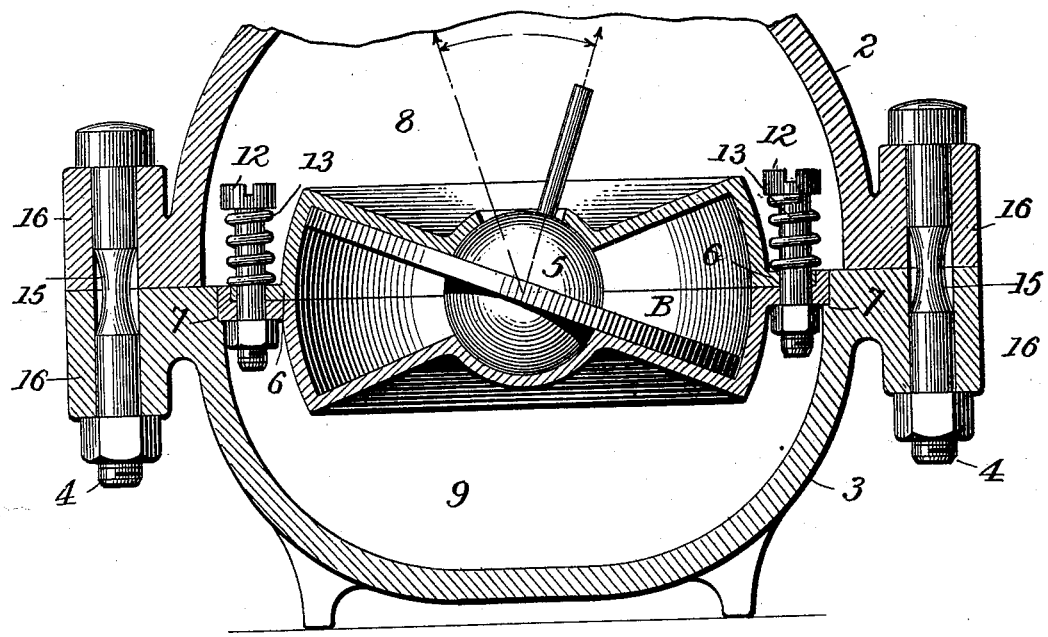
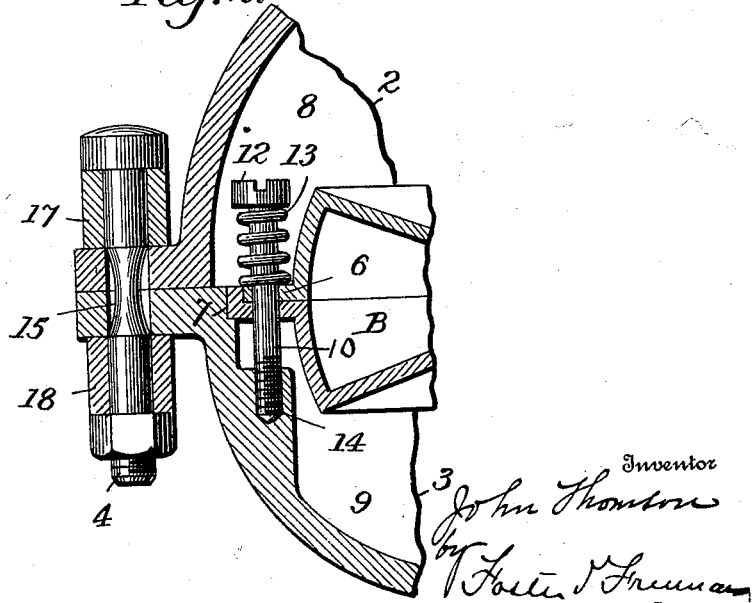

UNITED STATES PATENT OFFICE.

JOHN THOMSON, OF BROOKLYN, NEW YORK, ASSIGNOR TO THE NEPTUNE METER COMPANY, OF JERSEY CITY, NEW JERSEY.

WATER-METER.

SPECIFICATION forming part of Letters Patent No. 602,378, dated April 12, 1898.

Application filed July 21, 1897. Serial No. 645,466. (No model.)

*To all whom it may concern:*

Be it known that I, JOHN THOMSON, a citizen of the United States, residing at Brooklyn, in the county of Kings and State of New York, have invented certain new and useful Improvements in Water-Meters, of which the following is a specification.

My invention relates to water-meters, referring more particularly to the manner of securing the casings to prevent damage when they are subjected to an abnormal strain; and to this end my invention consists in the features hereinafter specified, when constructed and arranged to accomplish the results set forth.

In the drawings, Figure 1 is a vertical section of a water-meter, (of the disk system,) showing an embodiment of my invention; and Fig. 2 is a modification.

It is well known that water-meters are liable to injury from the freezing of the water, which on expanding disrupts one or the other sections of the main casing and distorts the internal casing of the meter unless provision is made to prevent such damage. These features have been recognized by me and have been overcome by constructions shown in my Patent No. 520,197, granted May 22, 1894, and No. 556,113, granted March 10, 1896, and also in a pending application, Serial No. 635,541, filed June 10, 1897. In the cases cited the internal disk-casing is secured to its seat by the attachment of the head to the main external casing. In the present instance I have adopted the principles of construction previously more broadly set forth to a type of meter in which the disk-casing is separately attached to the interior of one or the other of the main casings. Thus in the drawings 2 is the upper and 3 the lower main casings, secured together by bolts and nuts 4. The disk-casing B, composed of two or more sections, contains the disk and ball 5, and is here shown with flange 6 applied to a recessed seat or bearing 7 of the lower casing. It is to be assumed that the chambers 8 9, above and below the disk-casing, are filled with water, either or both of these chambers being connected to the inlet or the outlet port of the disk-casing, as the designer may elect.

Heretofore the sections of the disk-casing have been fixedly secured together by screws, and the disk-casing as a whole has also been fixedly secured to one or the other of the main casings. The consequence of this when such a meter is frozen and the main casings burst is to also burst or distort the disk-casing and rupture the retaining-screws, all of which I overcome by applying to such screws, as 10 or 12, a spring 13, interposed between the head of the screw and the flange of the disk-casing. The screw may either act to secure the disk-casing sections together only, as 12, or to also secure them to their seat, as when the screw 10 passes through into the main casing, as at 14. Thus in the event of freezing the meter the sections of the disk-casing are, first, free to separate, relieving the pressure within the sections, and, second, the disk-casing as a whole is also free to move from its seat or bearing without breaking the screws or affecting the accuracy of the measuring device.

While the foregoing action will take place in the event of the bursting of either of the main casings, I furthermore provide means for preventing damage to the said main casings by applying flange-bolts of unusual length, or, to be more specific, whose length shall be, say, from twice to three times the thickness of the flanges of the two casings, and then reducing the diameter of the bolts between the head and the nut by a smooth cut to the form of a curve, as at 15. These bolts may be applied by forming suitable bosses, as 16, upon the flange, or, and preferably so, by simply applying a sleeve or tube between the head and the nut, as 17 18, either or both, as may be desired.

The object of applying bolts of such unusual length and of definitely reducing their sectional area is to obtain the highest degree of resiliency with but a moderate margin of safety. In other words, this applies to useful purpose the well-known difference of action that takes place in a tension member relatively short or relatively long in which the point of rupture is predetermined by a sharp nick or a well-rounded fillet. By this construction ample strength is afforded in setting up the nuts to obtain a tight joint. The bolts will withstand the sharp shocks of water-rams, and yet under the persistent cumulative pressure of expanding ice they will slowly yield, pull apart, and save the more expensive structure.

This invention is not limited to the precise terms of description or illustration herein employed, but may be variously modified to suit the various demands of practice.

What I claim is—

1. In a water-meter, an internal casing whose component sections are secured together by resilient means.

2. In a water-meter, an internal casing attached to its seat in a main casing by resilient means.

3. In a water-meter, an internal casing whose component sections are secured together and also attached to a seat, or to a bearing, in a main casing by resilient means.

4. The combination with the disk-casing, of a screw arranged to secure the sections of the disk-casing together, having a spring interposed between its head and one of the sections of the disk-casing; substantially as specified.

5. The combination with the disk-casing and a section of the main casing, of a screw arranged to secure the disk-casings together and also to a seat, or to a bearing, in the main casing, having a spring interposed between its head and the disk-casing; substantially as specified.

6. In a water-meter, the combination with the main casings, of elongated flange-bolts whose normal diameters are reduced to the form of a curve, in longitudinal section; substantially as described.

7. In a water-meter, the combination with the main casings, of elongated flange-bolts, having definitely-weakened sections, and a sleeve or tube interposed between the flange and the head or nut of the bolt; substantially as described.

In testimony whereof I have signed my name to this specification in the presence of two subscribing witnesses.

JOHN THOMSON.

Witnesses:
JOHN McKINNON,
GEO. L. DE FRAINE.